(12) United States Patent
Kinoshita et al.

(10) Patent No.: US 8,335,826 B2
(45) Date of Patent: Dec. 18, 2012

(54) NETWORK SYSTEM, ACCESS MANAGEMENT SERVER, EVENT NOTIFICATION METHOD, NETWORK APPLIANCE AND COMPUTER PROGRAM

(75) Inventors: Akihiko Kinoshita, Tokyo (JP); Takashi Kanao, Tokyo (JP); Hiroyuki Chiba, Kanagawa (JP); Tsuyoshi Honma, Chiba (JP); Hirofumi Kouda, Saitama (JP)

(73) Assignee: Sony Corporation, Tokyo (JP)

( * ) Notice: Subject to any disclaimer, the term of this patent is extended or adjusted under 35 U.S.C. 154(b) by 832 days.

(21) Appl. No.: 11/960,170

(22) Filed: Dec. 19, 2007

(65) Prior Publication Data

US 2008/0178212 A1 Jul. 24, 2008

(30) Foreign Application Priority Data

Jan. 19, 2007 (JP) ................. 2007-010616

(51) Int. Cl.
*G06F 15/16* (2006.01)
*G06F 15/173* (2006.01)
*G06Q 10/00* (2006.01)
*G06Q 30/00* (2006.01)

(52) U.S. Cl. ............... 709/206; 709/224; 705/1; 705/14

(58) Field of Classification Search .......... 709/203–206, 709/224
See application file for complete search history.

(56) References Cited

U.S. PATENT DOCUMENTS

2002/0022991 A1* 2/2002 Sharood et al. ................. 705/14
2007/0118638 A1* 5/2007 Ban et al. ...................... 709/224

FOREIGN PATENT DOCUMENTS

JP 2001-309285 11/2001
JP 2005-173885 6/2005

OTHER PUBLICATIONS

U.S. Appl. No. 12/126,428, filed May 23, 2008, Chiba, et al.

* cited by examiner

*Primary Examiner* — Ashok Patel
*Assistant Examiner* — Evans Desrosiers
(74) *Attorney, Agent, or Firm* — Oblon, Spivak, McClelland, Maier & Neustadt, L.L.P.

(57) ABSTRACT

A network system is disclosed. The system includes: a terminal device; a network appliance to be controlled by the terminal device; a service server that provides a service for controlling the network appliance over a network to the terminal device; and an access management server that receives/transmits information for accessing the network appliance over the network. The network appliance has a message transmitting section, and the access management server has: a storage section and an event message transmission control section.

6 Claims, 13 Drawing Sheets

NETWORK SYSTEM, ACCESS MANAGEMENT SERVER, EVENT NOTIFICATION METHOD, NETWORK APPLIANCE AND COMPUTER PROGRAM

CROSS REFERENCES TO RELATED APPLICATIONS

The present invention contains subject matter related to Japanese Patent Applications JP 2007-010616 filed in the Japanese Patent Office on Jan. 19, 2007, the entire contents of which being incorporated herein by reference.

BACKGROUND OF THE INVENTION

1. Field of the Invention

The present invention relates to a network system, access management server, event notification method, network appliance and computer program, which allow controlling a network appliance from a terminal device over a network.

2. Description of the Related Art

In recent years, services have been widely spread that provide an electronic program guide (EPG) on broadcast programs by terrestrial analog television broadcasting, terrestrial digital television broadcasting, CS digital broadcasting and BS digital broadcasting, for example, and/or programs over the Internet, which is contents provided from a program distribution service site over the Internet.

As a service interlocking with an EPG, a remote programming service has been known which programs contents of a broadcast program, for example, which is selected on an EPG displayed on a display of a terminal device by recorder/player connecting to a network. In response to the reception of a request for remote programming from a terminal device over a network, a server that performs the remote programming service transmits programming information such as the channel number, date for broadcasting, starting/ending times for broadcasting and title of a program to be recorded to a network appliance such as recorder/player correlated with the terminal device. Based on the programming information received from the server, the recorder/player receives the broadcast program and records it in the recorder (refer to JP-A-2001-309285 (Patent Document 1), for example).

A technology for notifying problem alarm information in a network appliance to a mobile terminal over a network in real time may be disclosed in JP-A-2005-173885 (Patent Document 2), for example.

SUMMARY OF THE INVENTION

The inventors of the present application have studied a method that notifies a message including details of an event to a user of a terminal device through a service server that provides a service of controlling a network appliance from the terminal device over a network when some event occurs in the network appliance, such as the occurrence of insufficient HDD space or a mechanical problem in a recorder/player. In this method, a terminal device can receive the notification on an event of the insufficient HDD space from a recorder/player through a service server that provides a service of deleting recorded data in the HDD in the recorder/player and, in response thereto, transmit a request for deleting recorded data in the HDD to the recorder/player through the service server. Alternatively, a terminal device can receive the notification on an event of the occurrence of a problem from a recorder/player through a service server that provides a service of obtaining logs of the recorder/player and, in response thereto, transmit a request for obtaining logs of the recorder/player, to the recorder/player through the service server.

However, the number of varieties of services provided by a service server may possibly increase or decrease in the future, and a method has been studied in the past in which a network appliance such as a recorder/player transmits the notification on an event to a corresponding server based on a list having correspondence between event types and address information of service servers. Therefore, it is important to update the list within the recorder/player in accordance with a change on the service server side, and the update takes time, which is a problem.

Accordingly, it is desirable to provide a network system, access management server, event notification method, network appliance and computer program, which can address changes on the service server side flexibly and notify an event occurring in a network appliance to a proper service server according to the event type.

According to an embodiment of the present invention, there is provided a network system including a terminal device, a network appliance to be controlled by the terminal device, a service server that provides a service for controlling the network machine over a network to the terminal device, and an access management server that receives/transmits information for accessing the network appliance over the network, wherein the network appliance has a message transmitting section that, when an event occurs, transmits a message including event identification information for identification of the type of the event and machine identification information of the network appliance to the access management server, and the access management server has a storage section that stores a first relationship list including a relationship between a control machine/service management ID assigned to a combination between the identification information of the terminal device and a service to be provided by the service server and a controlled machine management ID assigned to the network appliance to be controlled by the terminal device and a second relationship list including a relationship among the event identification information, the control machine/service management ID and address information of the service server, and an event message transmission control section that identifies the address information of the service server, which is the destination of the notification of the event, based on the first relationship list and second relationship list stored in the storage section and the event identification information and machine identification information included in the message received from the network appliance.

According to the embodiment of the invention, an event occurring in the network appliance can be transmitted to a proper service server corresponding to the type of the event, without managing the address information of the service server, which is the destination of the notification of a message, for each type of event in the network appliance. Furthermore, by managing the relationship between event identification information and service identification information and the relationship between service identification information and address information of the service server in the access management server, the information managed by the access management server may be only changed in a case where the number of types of service to be provided by the service server increases or decreases or the location of the service server is changed, which eliminates the necessity for the change on the network machine side and thus can save the time of a user of the network appliance.

In the access management server according to the embodiment of the invention, based on operation mode information included in the message transmitted by the network appliance when an event occurs, the event message transmission control section may switch between an access mode in which the event is notified from the network appliance to the service server over the network and a tunneling mode in which the event is notified to the service server by tunneling through the access management server, transmit the address information of the service server, which is the destination of the notification of the event, to the network appliance in the access mode or transmit the event to the service server based on the address information in the tunneling mode.

Thus, in a case where a larger amount of data of an image or images such as a still image and moving images or audio data is to be attached to the message on an event and transmitted, the access mode may be selected in order to avoid the increase in load on the access management server or the tunneling mode in which the number of message transmission stages may be selected for transmitting a message on an event having a smaller amount of data since the notification only contains text data. Thus, efficient message transmission is allowed.

According to embodiments of the invention, an event occurring in a home electric appliance can be notified to a proper service server according to the event type while addressing a change on the service server side flexibly.

DESCRIPTION OF THE PREFERRED EMBODIMENTS

With reference to drawings, embodiments of the invention will be described below.

Figure 1:
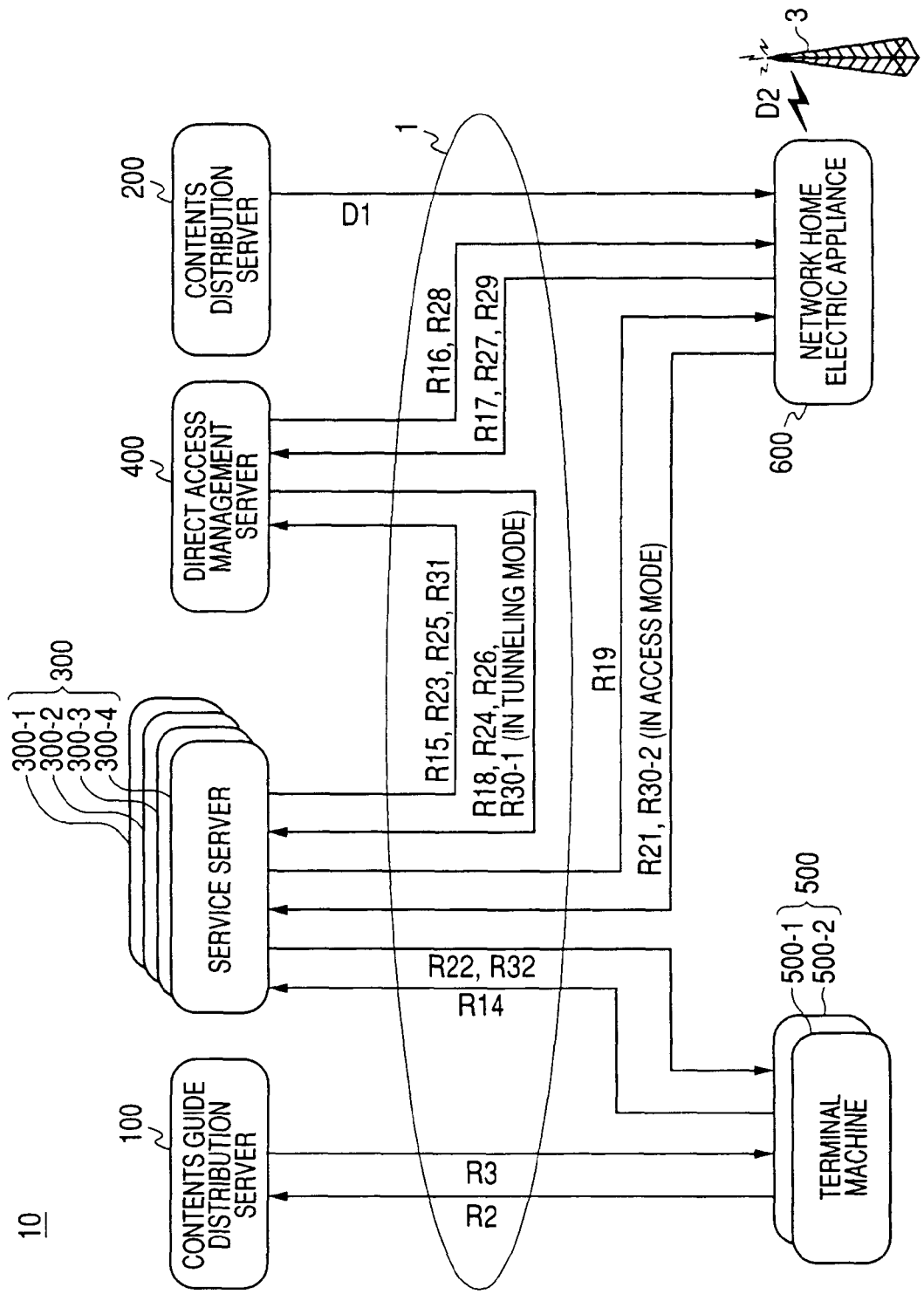
FIG. 1 is a diagram showing an entire configuration of a network system according to an embodiment of the invention.

FIG. 1 is a diagram showing an entire configuration of a network system 10 according to an embodiment of the invention.

The network system 10 includes a contents guide distribution server 100, a contents distribution server 200, a service server 300 (service server 300-1, 300-2, 300-3 or 300-4), a direct access management server 400, a terminal machine 500 (terminal machine 500-1 or 500-2) and a network home electric appliance 600 such as a recorder/player, which are connectable to each other for allowing mutual communication over a network 1 such as the Internet.

The reference numerals 300-1, 300-2, 300-3 and 300-4 under the shown service server refer to service servers, and each of the service servers will be referred by "service server 300" or "service server 300 (service server 300-1, 300-2, 300-3 or 300-4) if the specification among them is not important in particular. Also, the reference numerals 500-1 and 500-2 under the shown terminal machine refer to terminal machines, and the each of the terminal machines will be referred by "terminal machine 500" or "terminal machine 500 (terminal machine 500-1 or 500-2) if the specification between them is not important in particular.

The contents distribution server 200 is a server that distributes contents data D1 of moving images or audio, for example, over the network 1 by IP multicast broadcasting or VoD (Video on Demand), for example. Multiple contents distribution servers 200 may be connected to the network 1.

The contents guide distribution server 100 is a server that stores contents guide data including a broadcast schedule, outlines, important information for programming and important information for programming for downloading for the contents data D1 to be distributed from the contents distribution server 200 and/or contents data D2 of a broadcast program to be distributed from a broadcast station 3. The contents guide distribution server 100 in response to the reception of a contents guide acquisition request R2 from the terminal machine 500 connecting to the network 1 distributes contents guide data as a contents guide acquisition response R3 to the terminal machine 500 over the network 1.

The service server 300 (service server 300-1, 300-2, 300-3 or 300-4) provides the terminal machine 500, which is a control machine, a service for accessing the recorder/player 600, which is a controlled apparatus, over the network. The service server 300 (service server 300-1, 300-2, 300-3 or 300-4) can provide a service for notifying the terminal machine 500 of a message on an event when the event occurs in the recorder/player 600. Each service server 300 (service server 300-1, 300-2, 300-3 or 300-4) may be provided for each type of service or may provide one or more services.

The direct access management server 400 manages the relationship between a combination of the terminal machine 500 and a service to be provided by the service server 300 and the recorder/player 600 and performs processing relating to the exchange of information such as a direct access URI for directly accessing the recorder/player 600 over the network 1 based on the relationship. The direct access management server 400 further manages the relationship between a combination between a user ID for identifying the terminal machine 500 and the type of service and a control machine/service management ID, the relationship between the type of event occurring in the recorder/player 600 and the type of service, and, for each type of service, address information such as the URL of the service server 300 that provides the service. Based on the information, the direct access management server 400 performs processing of identifying the service server 300, which is the destination of the notification of the event occurring in the recorder/player 600.

The terminal machine 500 (terminal machine 500-1 or 500-2) is an apparatus that can control the recorder/player 600 over the network 1 by using a service provided by the service server 300.

The recorder/player 600 is an apparatus that can perform an operation such as remote programming, deletion of recorded data and log output in response to the request transmitted from the terminal machine 500 by using a service provided by the service server 300.

Figure 2:
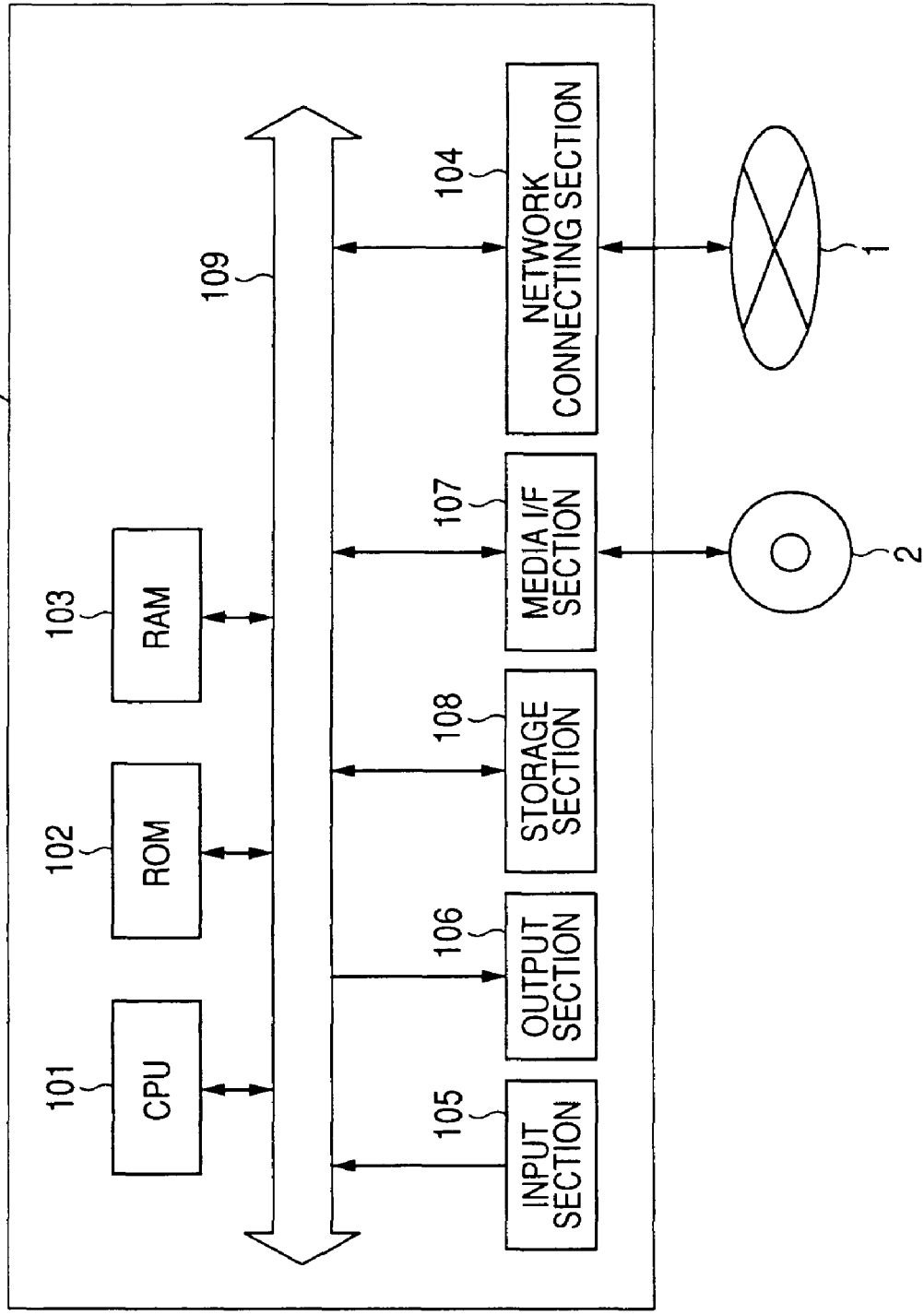
FIG. 2 is a block diagram showing a configuration of hardware of the contents guide distribution server, contents distribution server, service server, and direct access management server in FIG. 1.

Each of the contents guide distribution server 100, contents distribution server 200, service server 300 (service server 300-1, 300-2, 300-3 or 300-4) and direct access management server 400 may include a typical computer system such as a personal computer, as shown in FIG. 2, for example.

In other words, a ROM (read only memory) 102, a RAM (random access memory) 103, a network connecting section 104, an input section 105 including a keyboard and/or a mouse, a display including a CRT (cathode ray tube) or an LCD (liquid crystal display), for example, an output section 106 including a speaker, for example, a media interface section 107 and a storage section 108 including a hard disk drive and/or a non-volatile memory, for example, are connected to a CPU (central processing unit) 101 via a system bus 109.

The network connecting section 104 is means for performing communication processing over the network 1. The storage section 108 stores a program for software processing and data. The CPU 101 loads, interprets and executes a program from the storage section 108 to the RAM 103 in order to implement software processing. A removable medium 2 such as a magnetic disk, an optical disk, a magnetooptical disk and a semiconductor memory may be attached to the media interface section 107 properly, and the loaded program is installed to the storage section 108 as necessary.

Next, with reference to FIG. 3, the software configuration of the service server 300 will be described. The service server 300 includes a storage section 301, a service implementing section 302 and an event message transmitting section 303.

The storage section 301 stores an ID relationship list 311 including a relationship between a combination between a user ID for identifying the terminal machine 500 and a service ID indicating the type of service and a control machine/service management ID assigned by the direct access management server 400.

Based on the information stored in the storage section 301, the service implementing section 302 implements a specific service of accessing the recorder/player 600 over a network for the terminal machine 500, such as remote programming, deletion of recorded data and acquisition of logs.

The event message transmitting section 303 performs processing of receiving a message on the occurrence of an event from the recorder/player 600 and transmitting it to the terminal machine 500 based on the relationship list 311 stored in the storage section 301.

Next, with reference to FIG. 4, the software configuration of the direct access management server 400 will be described. The direct access management server 400 includes a storage section 401, a registration processing section 402, a direct access request processing section 403, an XMPP server 404 and an event message transmission control section 405.

The storage section 401 stores a management ID relationship list 411, a machine ID relationship list 412 and an event ID relationship list 413.

Figure 9:
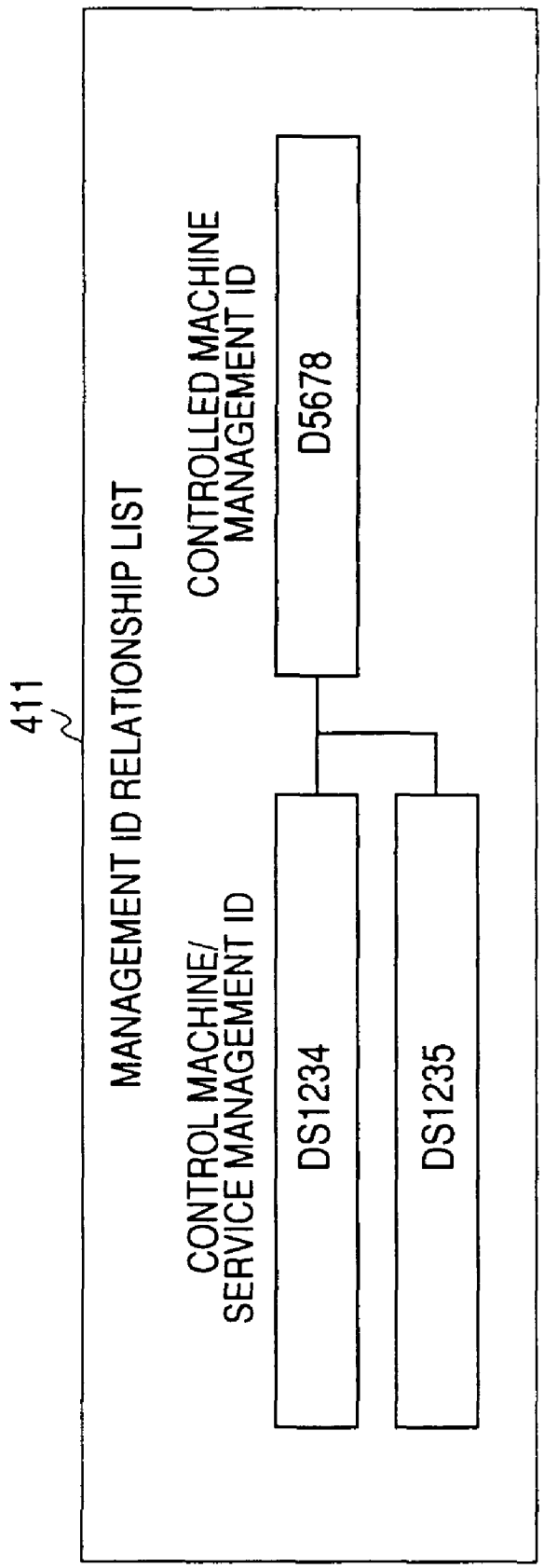
FIG. 9 is a diagram showing a configuration of a management ID relationship list.

FIG. 9 is a diagram showing a configuration of the management ID relationship list 411. The management ID relationship list 411 is a list including a relationship between a control machine/service management ID, which is an ID given to a combination between the terminal machine 500, which is a control machine, and the type of service and a controlled machine management ID, which is an ID assigned to the network home electric appliance 600 as a controlled machine.

Figure 10:
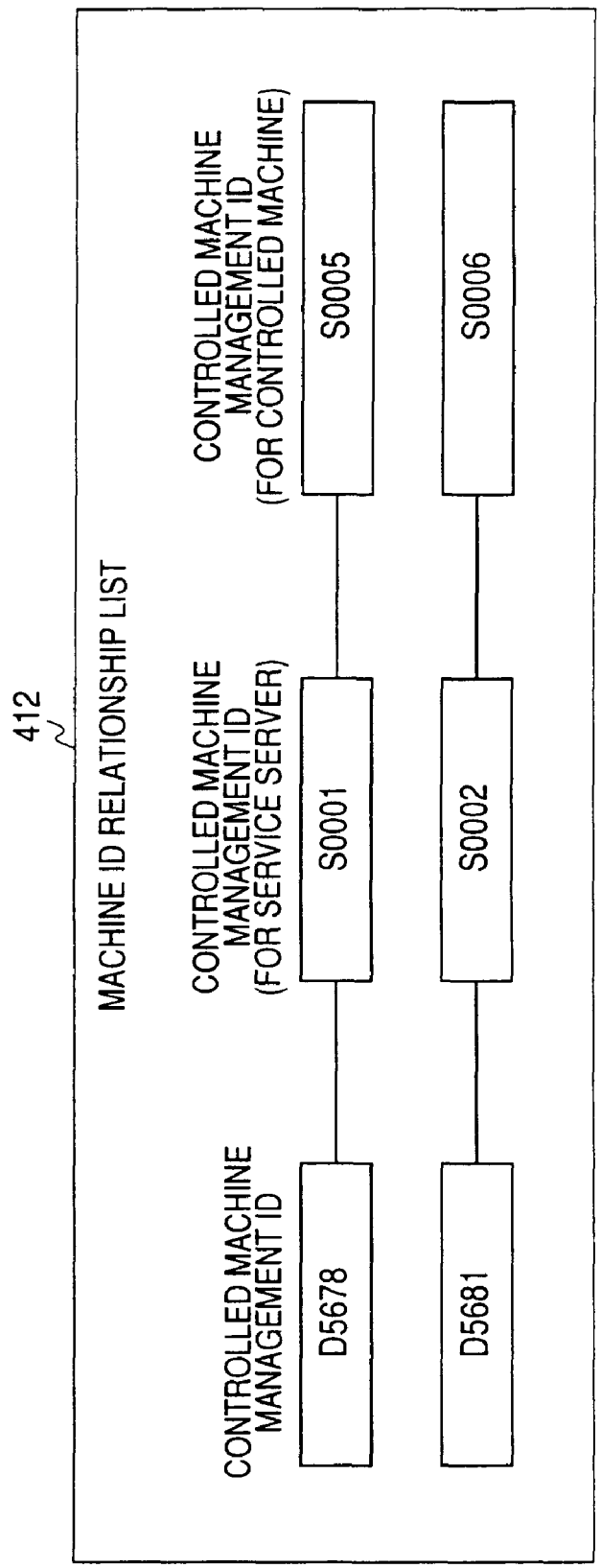
FIG. 10 is a diagram showing a configuration of management ID relationship list.

FIG. 10 is a diagram showing a configuration of the machine ID relationship list 412. The machine ID relationship list 412 is a list including a relationship among a controlled machine management ID, a controlled machine ID for the service server corresponding to the controlled machine management ID and a controlled machine ID for the controlled machine corresponding to the controlled machine management ID.

Figure 11:
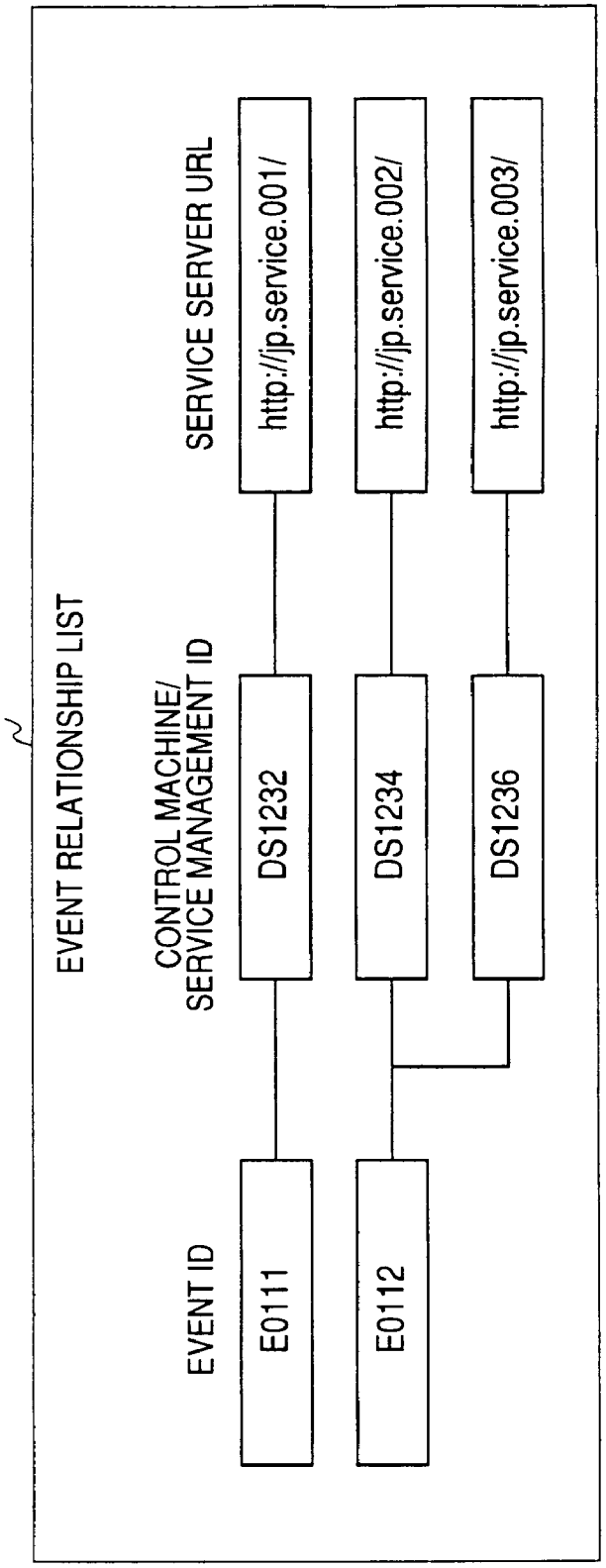
FIG. 11 is a diagram showing a configuration of an event relationship list.

FIG. 11 is a diagram showing a configuration of the event ID relationship list 413. The event ID relationship list 413 is a list including a relationship among an event ID indicating the type of event, a control machine/service management ID and address information such as a URL of the service server 300.

Referring back to FIG. 4, in response to the reception of a control machine/service registration request R23 including a user ID and a service ID from the service server 300, the registration processing section 402 assigns a control machine/service management ID to a combination of the user ID and service ID included in the control machine/service registration request R23, registers it with the management ID relationship list 411 and transmits the control machine/service management ID as a control machine/service registration response R24 to the service server 300 over the network 1.

Separately in response to the reception of a service server registration request R25 including an event ID indicating the type of event, a control machine/service management ID, and address information such as a URL of the service server 300 from the service server 300, the registration processing section 402 registers the event ID, control machine/service management ID and address information such as a URL of the service server 300 included in the service server registration request R25 in connection with the event ID relationship list 413 and, after the completion of the registration, transmits a registration completion notification R26 to the service server 300.

In response to the reception of a controlled machine registration request R27 from the network home electric appliance 600, the registration processing section 402 assigns the controlled machine management ID to the network home electric appliance 600, registers it in connection with a proper control machine/service management ID with the management ID relationship list 411 and, after the completion of the registration, transmits a registration completion notification R28 to the network home electric appliance 600 over the network 1. Here, as a method for determining which control machine/service management ID is to be correlated with the controlled machine management ID, a method using a password for registering a controlled machine may be used as follows.

In this method, after a control machine/service management ID is registered with the direct access management server 400, the service server 300 requests the direct access management server 400 the issue of a password for controlled machine registration. The direct access management server 400 in response to the reception of the request creates a password for controlled machine registration and correlates and saves it with a control machine/service management ID and transmits it to the service server 300. The service server 300 transmits the password for controlled machine registration to the terminal machine 500. The terminal machine 500 uses an optical communication section 511 (refer to FIG. 5) to transfer the obtained password for controlled machine registration to the network home electric appliance 600. The network home electric appliance 600 adds the password for controlled machine registration to a controlled machine registration request R27 and transmits the result to the direct access management server 400. The direct access management server 400 in response to the reception of the controlled machine registration request R27 creates a controlled machine management ID, compares the password for controlled machine registration included in the controlled machine registration request R27 and the password for controlled machine registration correlated and saved with a control machine/service management ID, if they agree, correlates the control machine service management ID correlated with the agreed password for controlled machine registration with the created controlled machine management ID and saves the result to the management ID relationship list 411.

In response to the reception of a direct access start request R15 including the control machine/service management ID from the service server 300, the direct access request processing section 403 determines the controlled machine management ID tied with the control machine/service management ID included in the direct access start request R15 with reference to the tie between the control machine/service management ID included in the direct access start request R15 and the control machine/service management ID and controlled machine management ID included in the management ID relationship list 411. The direct access request processing section 403 further determines the controlled machine ID for the controlled machine corresponding to the controlled machine management ID with reference to the machine ID relationship list 412 and transmits a direct access information acquisition request R16 to the network home electric appliance 600. The direct access information acquisition request R16 here requests the acquisition of a direct access URI (uniform resource identifier), which is information for directly accessing to the network home electric appliance 600 over the network 1. The direct access request processing section 403 further receives a direct access information acquisition response R17 including the direct access URI from the network home electric appliance 600 and transmits a direct access start response R18 including the direct access URI to the service server 300.

Here, the direct access URI includes a local IP address, a global IP address mapped to a port number and the port number of the network home electric appliance 600 in a router in a case where the network home electric appliance 600 is connected to the network 1 through the router. However, in a case where the network home electric appliance 600 is directly connected to the network 1, the direct access URI may be a global IP address assigned to the network home electric appliance 600.

The direct access management server 400 includes the XMPP (extensible Messaging and Presence Protocol) server 414 for defining a bidirectional permanent connection session with the network home electric appliance 600. XMPP is a protocol for implementing real time communication. Before the terminal machine 500 accesses the network home electric appliance 600 over the network 1, the permanent connection session is defined by logging in the XMPP server 404 by the network home electric machine 600. In response to the reception of the direct access start request R15 from the service server 300 establishing the XMPP session with the XMPP server 404, the direct access management server 400 transmits the direct access information acquisition request R16 to the network home electric appliance 600 through the permanent connection session established between the XMPP server 404 and the network home electric appliance 600.

In response to the reception of a message R29 including the controlled machine ID for the controlled machine, event ID and operation mode information, which is transmitted from the network home electric appliance 600 when an event occurs in the network home electric appliance 600 connected through the permanent connection session, the event message transmission control section 405 loads the controlled machine management ID corresponding to the controlled machine ID included in the message R29 from the machine ID relationship list 412 and further determines the control machine/service management ID correlated to the controlled machine management ID with reference to the management ID relationship list 411.

The event message transmission control section 405 further determines the address information of the service server 300, which is the destination of the notification of the message with reference to the event ID relationship list 413 based on the determined control machine/service management ID and the event ID included in the message R29. Then, the event message transmission control section 405 determines the operation mode for transmitting a message R30 to the service server 300 based on the operation mode information included in the received message R29 and controls to transmit a message R30-1 or R30-2 on the event occurring in the network home electric appliance 600 to the service server 300 determined as the destination of the notification of the message.

Figure 5:
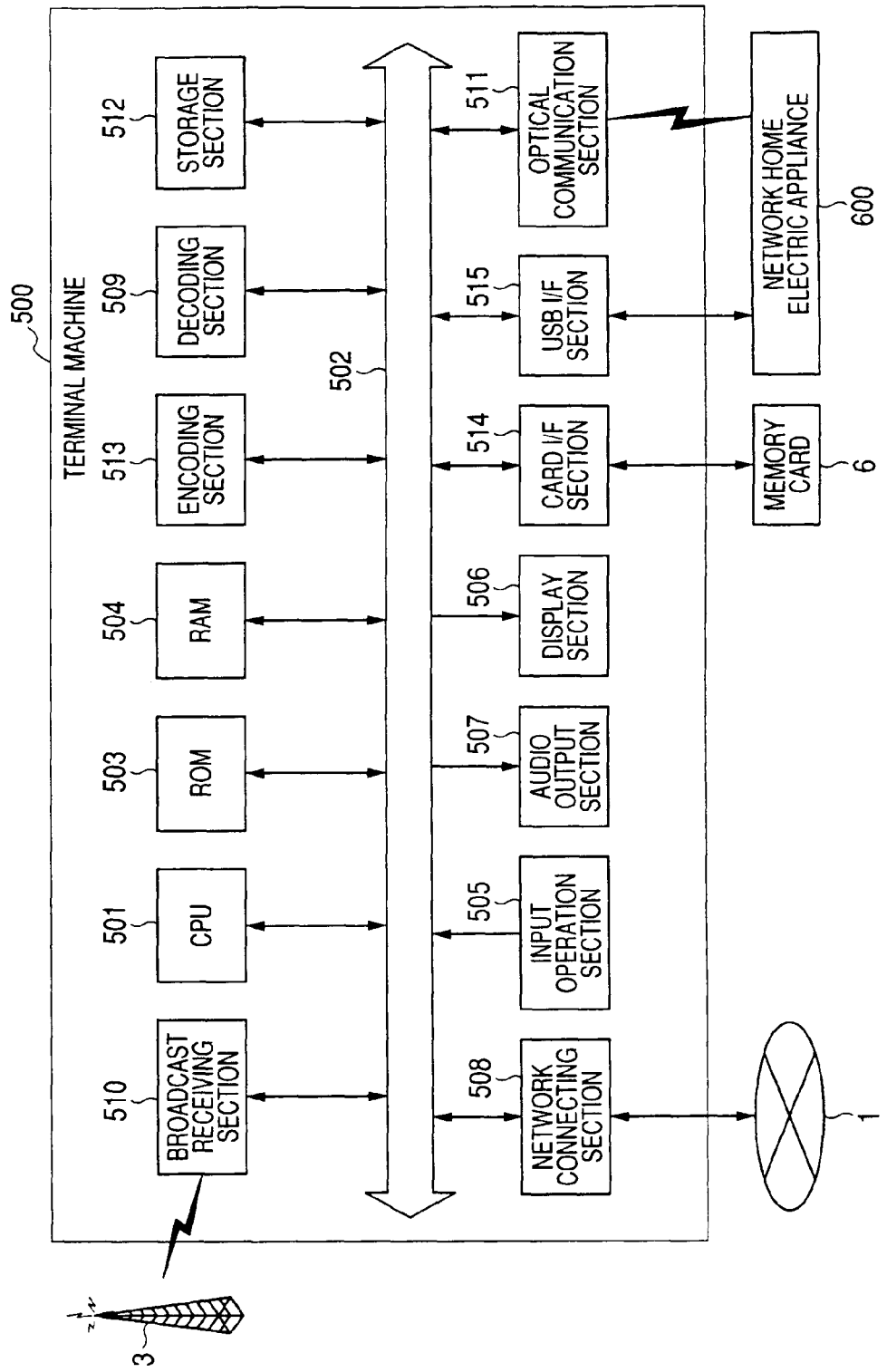
FIG. 5 is a block diagram showing a configuration of hardware of a terminal machine.

Next, the terminal machine 500 will be described. FIG. 5 is a block diagram showing the hardware configuration of the terminal machine 500. As shown in FIG. 5, a ROM 503, a RAM 504, an input operation section 505, a display section 506, an audio output section 507, a network connecting section 508, a decoding section 509, a broadcast receiving section 510, an optical communication section 511, a storage section 512, an encoding section 513, a card interface section 514 and a USB interface section 515 are connected to a CPU 501 via a system bus 502.

The input operation section 505 includes keys and processes the input of a command and/or data from a user. The command input by a user through the input operation section 505 is supplied to the CPU 501 via the system bus 502 by an input interface section, not shown.

The display section 506 includes a display such as an LCD and a display control circuit that drives the display and may display an EPG obtained from the contents guide distribution server 100. The audio output section 507 includes a circuit that converts a digital audio signal to an analog audio signal and a speaker.

The network connecting section 508 processes the wired or wireless connection with the network 1. The broadcast receiving section 510 receives broadcast waves distributed from a broadcast station 3, such as those of terrestrial analog television broadcasting, terrestrial digital television broadcasting, CS digital broadcasting, BS digital broadcasting, and terrestrial digital television broadcasting for mobile equipment, and demodulates a video signal and an audio signal.

The decoding section 509 decodes encoded data of a program loaded from the storage section 512 and reproduces digital video data and digital audio data. The reproduced digital video data is supplied to and displayed on the display section 506 via the system bus 502 while the digital audio data is supplied to the audio output section 507 via the system bus 502 and is output as audio by the speaker.

The optical communication section 511 is an interface for processing the communication with an external machine such as the network home electric appliance 600 and, more specifically, performs communication with an external machine by using light, such as an infrared ray, as a wireless medium.

Other wireless medium such as radio waves, sound waves, electromagnetic waves may be used instead of light. The communication with the network home electric machine 600 may be implemented over the network 1 instead of the optical communication.

The encoding section 513 encodes a video signal and an audio signal of a broadcast program output by the broadcast receiving section 510 by MPEG2 (Moving Picture Experts Group 2).

The storage section 512 stores contents guide data obtained from the contents guide distribution server 100 over the network 1 and a programming list created by the terminal machine 500 itself, for example. The storage section 512 may further store data of a broadcast program, which is received by the broadcast receiving section 510 and is encoded by the encoding section 513.

The card interface section 514 is an interface that reads/writes data from/to a recording medium 6 such as a memory card including a semiconductor memory. The USB interface section 515 is an interface for performing data transfer with an external machine such as the network home electric appliance 600.

The ROM 503 is a read only memory permanently storing a program and/or data for software processing to be implemented by the terminal machine 500. The program may be stored in the storage section 512. The RAM 504 is a writable volatile memory, which is used for loading a program codes to be implemented by the CPU 501 and/or writing work data of a program. The CPU 501 centrally controls those components and controls the exchange of data among the components. The CPU 501 loads, interprets, and executes a program from the storage section 512 or ROM 503 to the RAM 504 for implementing software processing to be implemented by the terminal machine 500.

Next, with reference to FIG. 6, the software configuration of the terminal machine 500 will be described.

Figure 6:
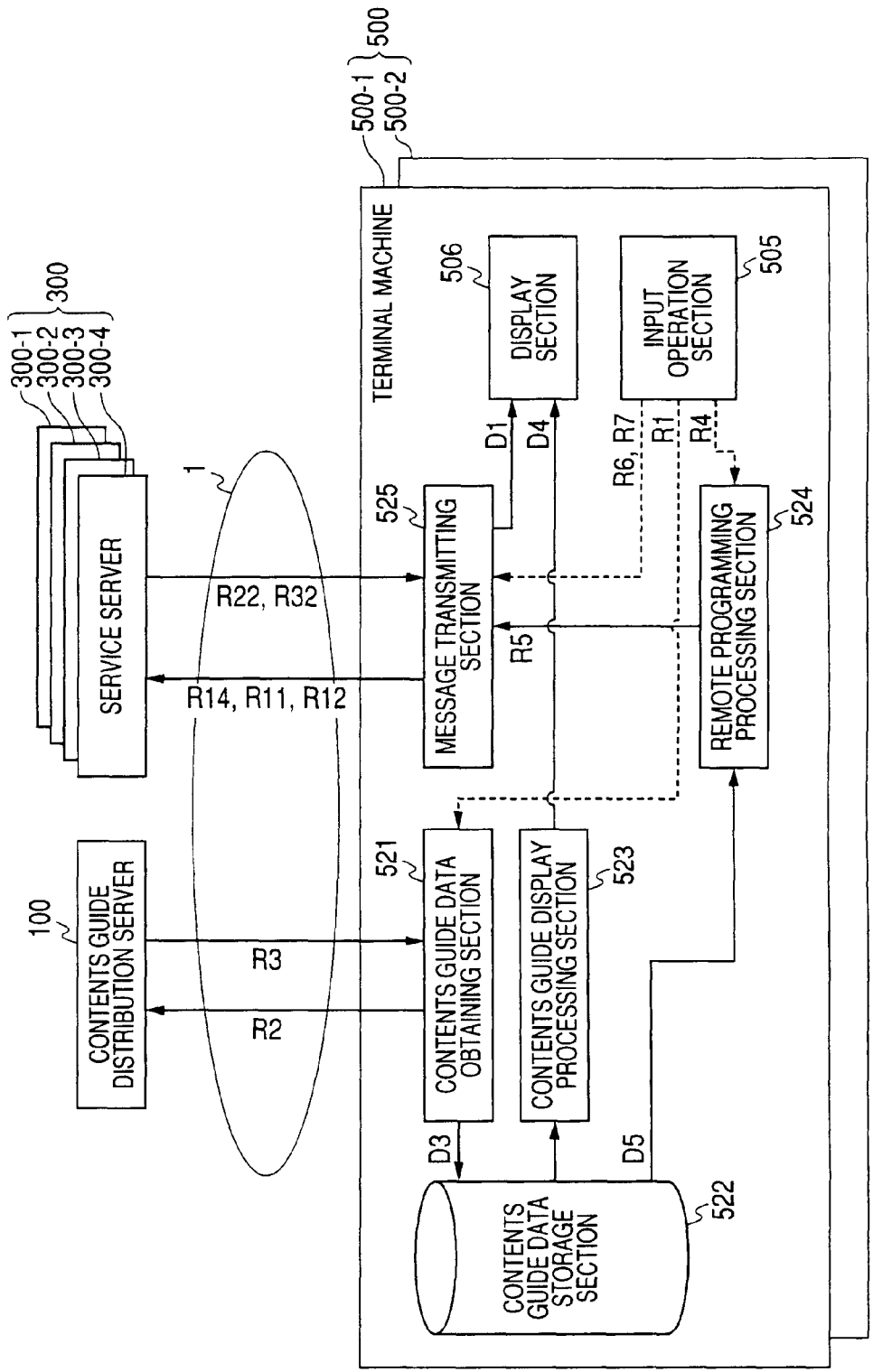
FIG. 6 is a block diagram showing a configuration of software of the terminal machine.

As shown in FIG. 6, the terminal machine 500 includes a contents guide data obtaining section 521, a contents guide data storage section 522, a contents guide display processing section 523, a remote programming processing section 524 and a message transmitting section 525. The contents guide data storage section 522 is defined in the storage section 512 or RAM 504.

The contents guide data obtaining section 521 obtains contents guide data from the contents guide distribution server 100 over the network 1 and stores contents guide data D3 to the contents guide data storage section 522.

The contents guide display processing section 523 performs processing of loading the contents guide data D3 stored in the contents guide data storage section 522, creating display data D4 for a contents guide screen and displaying it on the display section 506.

The message transmitting section 525 performs processing relating to the exchange of requests and/or a message on an event with the recorder/player 600 over the network 1.

When the input operation section 505 is used to input the selection of contents and a remote programming command R4 for the contents by a user on the contents guide screen displayed on the display section 506, the remote programming processing section 524 extracts programming information D5, which is information for remote programming on the selected contents, from the contents guide data stored in the contents guide data storage section 522, and transmits a message issue command R5 for the remote programming request including the programming information D5 to the message transmitting section 525.

The message transmitting section 525 may further create and transmit a message for a request excluding one for remote programming in accordance with a command R6 or R7 given by a user through the input operating section 505. For example, in a case where a user inputs the command R6 that instructs to delete recorded data in the recorder/player 600, for example, the message transmitting section 525 creates a message R11 that requests to delete recorded data to the recorder/player 600 and transmits it to the service server 300 (such as the service server 300-2) that provides the corresponding service. In a case where a user inputs the command R7 that requests to output logs to the recorder/player 600, the message transmitting section 525 creates a message R12 that requests to output logs to the recorder/player 600 and transmits it to the service server 300 (such as the service server 300-3) that provides the corresponding service.

Notably, it is assumed here that the terminal machine 500 according to this embodiment is a mobile terminal such as a cellular phone and a PDA (personal digital assistant) or a personal computer, for example. However, the terminal machine 500 of the invention is not limited to those machines but may have any form as far as it has the elements shown in FIGS. 5 and 6.

Figure 7:
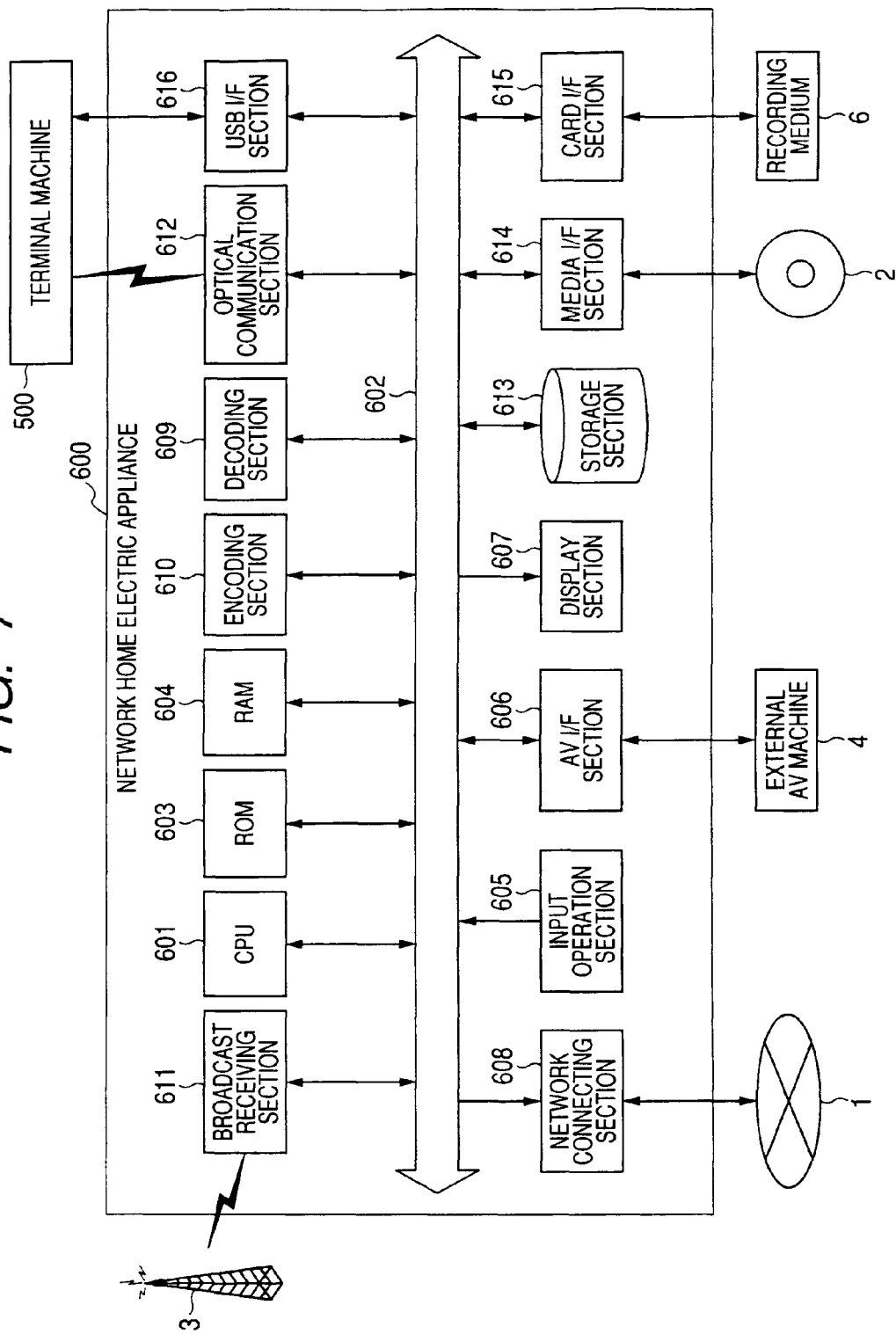
FIG. 7 is a block diagram showing a configuration of hardware of a recorder/player.

Next, the network home electric appliance 600 will be described. FIG. 7 is a diagram showing the hardware configuration of the network home electric appliance 600.

It is assumed that the network home electric appliance 600 of this embodiment may be a recorder/player that can record and/or play contents data D1 distributed by the contents distribution server 200 over the network 1 or contents data D2 of a broadcast program broadcasted every moment from the broadcast station 3 for terrestrial analog television broadcasting, terrestrial digital television broadcasting, CS digital broadcasting or BS digital broadcasting, for example.

As shown in FIG. 7, a ROM 603, a RAM 604, an input operation section 605, an AV interface section 606, a display section 607, a network connecting section 608, a decoding section 609, an encoding section 610, a broadcast receiving section 611, an optical communication section 612, a storage section 613 including a hard disk drive (HDD), for example, a media interface section 614, a card interface section 615 and a USB interface section 616 are connected to a CPU 601 via a system bus 602.

The input operation section 605 includes keys and processes the input of a command for recording/playing from a user. A command input through the input operation section 605 is supplied to the CPU 601 via the system bus 602 through an interface section, not shown.

The display section 607 may include a display such as an LCD and a display control circuit that drives the display, for example, and confirms a command and/or data input from a user and displays a status, for example.

The AV interface section 606 processes the input/output of a video signal and an audio signal from/to an external AV machine 4 such as a television connecting to the network home electric appliance 600.

The broadcast receiving section 611 receives broadcast waves distributed from the broadcast station 3 for terrestrial analog television broadcasting, terrestrial digital television broadcasting, CS digital broadcasting and/or BS digital broadcasting, for example, and demodulates a video signal and an audio signal.

The encoding section 610 encodes a video signal and an audio signal of a broadcast program output from the broadcast receiving section 611 by MPEG 2 (Moving Picture Experts Group 2).

The network connecting section 608 processes the connection with the network 1. The decoding section 609 decodes contents data obtained from the contents distribution server 200 over the network 1 and encoded data of a program loaded from the storage section 613 and reproduces video data and audio data. The reproduced digital video data is supplied to the AV interface section 606 via the system bus 602 and is output to the external AV machine 4 such as a television connecting to the AV interface section 606.

The optical communication section 612 is an interface for processing the communication with an external machine such as the terminal machine 500 and, more specifically, performs communication with an external machine by using light, such as an infrared ray, as a wireless medium. Other wireless medium such as radio waves, sound waves, electromagnetic waves may be used instead of light. The communication with the terminal machine 500 may be implemented over the network 1 instead of the optical communication.

The storage section 613 is a storage section including a hard disk drive, for example. The storage section 613 stores programming information D5 transmitted from the terminal machine 500, download programming information D6, an event ID and a machine ID, contents data obtained from the contents distribution server 200 over the network 1 and contents data of a broadcast program received by the broadcast receiving section 611 and encoded by the encoding section 610.

A removable medium 2 such as an optical disk may be attached to the media interface section 614, and contents data of a broadcast program, for example, may be recorded in the removable medium 2. The removable medium 2 may be a write-once or rewritable DVD (digital versatile disc) or a blu-ray disc.

The card interface section 615 is an interface for reading or writing data to or from the storage medium 6 such as a memory card including in a semiconductor memory. The USB interface section 616 is an interface for transferring data to an external machine such as the terminal machine 500.

The ROM 603 stores a program for software processing to be implemented by the network home electric appliance 600. The RAM 604 is a writable volatile memory to be used for loading a program code to be executed by the CPU 501 or writing work data of a program. The CPU 601 loads, interprets and executes a necessary program from the ROM 603 to the RAM 604 for implementing software processing to be implemented by the network home electric appliance 600.

Next, with reference to FIG. 8, the software configuration of the network home electric appliance 600 will be described.

Figure 8:
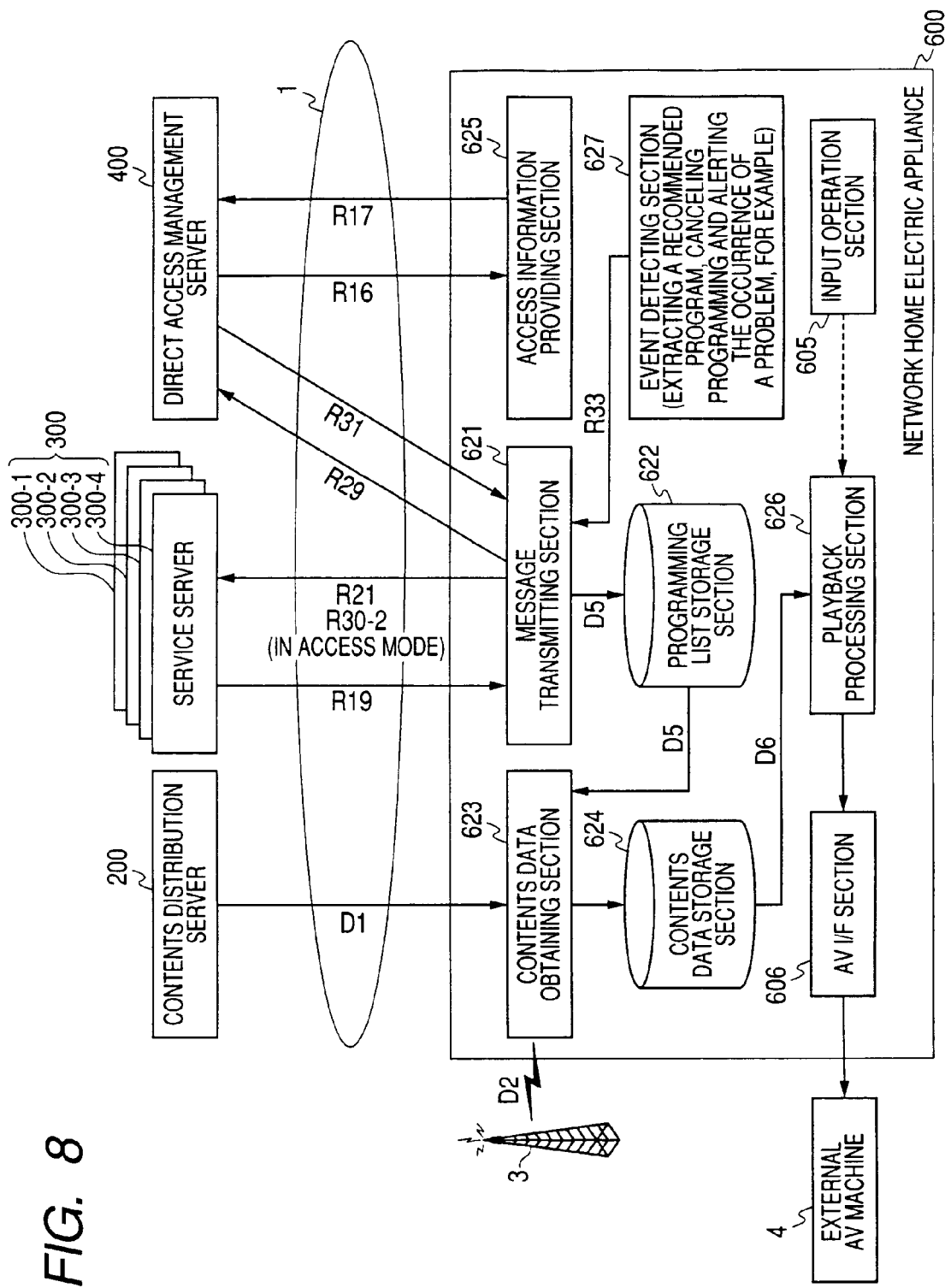
FIG. 8 is a block diagram showing a configuration of software of the recorder/player.

As shown in FIG. 8, the network home electric appliance 600 includes a message transmitting/receiving section 621, a programming list storage section 622, a contents data obtaining section 623, a contents data storage section 624, a direct access information providing section 625, a playback processing section 626 and an event detecting section 627. Here, the programming list storage section 622 and contents data storage section 624 may be defined in the removable medium 2 attached to the storage section 613 or media interface section 614.

The message transmitting/receiving section 621 performs processing relating to the exchange of messages on requests and/or events to/from the terminal machine 500 over the network 1.

The contents data obtaining section 623 selectively receives contents data D1 distributed from the contents distribution server 200 or contents data D2 of a broadcast program broadcasted from the broadcast station 3 and records it in the contents data storage section 624 based on the programming information D5 stored on the programming list within the programming list storage section 622.

The direct access information providing section 625 logs in the XMPP server 404 of the direct access management server 400 and performs processing of defining a bidirectional permanent connection session with the direct access management server 400. In response to the reception of a direct access information acquisition request R16 from the direct access management server 400 through a permanent connection session, the direct access information providing section 625 creates a direct access URI including the global IP address and port number mapped to the local IP address and port number of the network home electric appliance 600 in a router connecting the network home electric appliance 600 to the network 1 and transmits a direct access information acquisition response R17 including the direct access URI to the direct access management server 400.

The playback processing section 626 performs processing of playing contents data D6 selected by a user through the input operation section 605 among recorded contents data recorded in the contents data storage section 624.

The event detecting section 627 performs processing of detecting an event occurring in the network home electric appliance 600 and transmitting a message corresponding to the event to the message transmitting section 621.

Next, operations of this embodiment will be described.

First of all, an operation will be described in a case where remote programming is performed on the network home electric appliance 600 by using a service provided by the service server 300 in the terminal machine 500.

First, referring to FIG. 6, a user of the terminal machine 500 inputs a contents guide view command R1 though the input operation section 505. In response to the input of the contents guide view command R1, the contents guide data obtaining section 521 within the terminal machine 500 transmits a contents guide acquisition request R2 to the contents guide distribution server 100 over the network 1. In response to the reception of the contents guide acquisition request R2, the contents guide distribution server 100 transmits contents guide data as a contents guide acquisition response R3 to the terminal machine 500 over the network 1.

The contents guide data obtaining section 521 within the terminal machine 500 receives the contents guide data D3 as the contents guide acquisition response R3 transmitted from the contents guide distribution server 100 and stores it to the contents guide data storage section 522. Upon completion of the acquisition of the contents guide data, the contents guide display processing section 523 within the terminal machine 500 creates EPG display data D4 from the contents guide data stored in the contents guide data storage section 522 and outputs it to the display section 506. Thus, a contents guide screen is displayed on the display section 506 of the terminal machine 500.

In response to the selection of contents and the input of a remote programming command R4 for the contents by a user through the input operation section 505 on the contents guide screen displayed on the display section 506, the remote programming processing section 524 first determines the selected contents. After that, the remote programming processing section 524 extracts programming information D5, which is information for remote programming of the selected contents, from the contents guide data stored in the contents guide data storage section 522.

Next, the remote programming processing section 524 gives a remote programming request issue command R5 including the programming information D5 to the message transmitting section 525.

In response to the remote programming request issue command R5 from the remote programming processing section 524, the message transmitting section 525 transmits a message on a remote programming request R14 including the programming information D5 to the service server 300 (which is assumed here as the service server 300-1) that provides the service of remote programming over the network 1.

Figure 3:
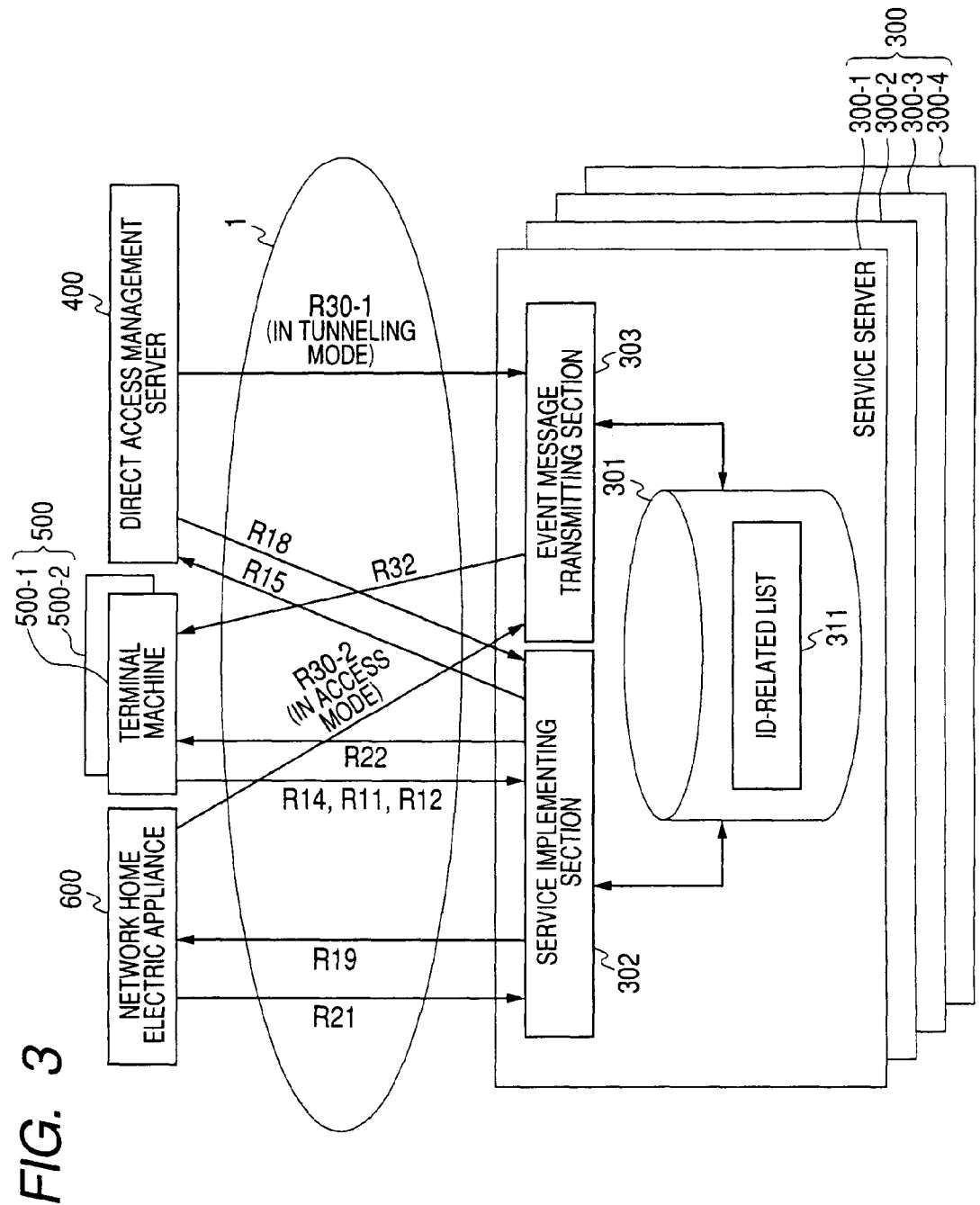
FIG. 3 is a block diagram showing a configuration of software of the service server.

Referring to FIG. 3, in response to the reception of the message on the remote programming request R14 from the terminal machine 500, the service implementing section 302 within the service server 300-1 transmits a message on a direct access start request R15 that requests to obtain information for directly accessing the network home electric appliance 600 corresponding to the combination of the terminal machine 500 and the remote programming service to the direct access management server 400 over the network 1. The direct access start request R15 includes a control machine/service management ID, which is an ID assigned to a combination of the terminal machine 500, which is a control machine, and a remote programming service, which is pre-registered in the service server 300-1.

Figure 4:
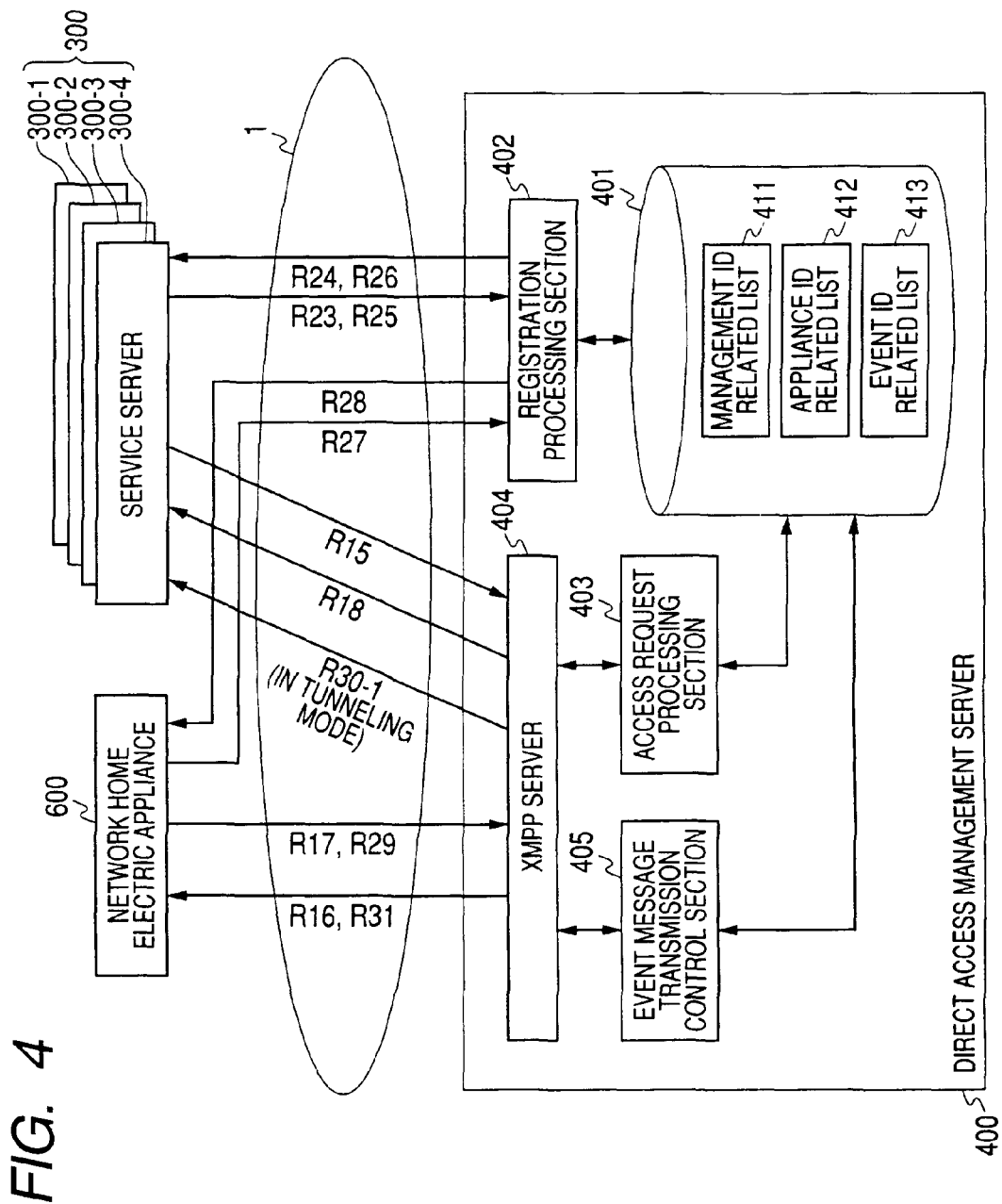
FIG. 4 is a block diagram showing a configuration of software of the direct access management server.

Referring to FIG. 4, the XMPP 404 is in operation within the direct access management server 400 for defining a bidirectional permanent connection session with the network home electric appliance 600, which has been registered as a controlled machine. The service server 300-1 establishes an XMPP session with the direct access management server 400 and exchanges information with the direct access management server 400 over the XMPP session.

In response to the reception of the message on the direct access start request R15 from the service server 300-1 over the permanent connection session, the direct access request processing section 403 within the direct access management server 400 determines the controlled machine management ID tied to the control machine/service management ID included in the direct access start request R15 with reference to the management ID relationship list 411 stored in the storage section 401. Then, the direct access request processing section 403 determines the controlled machine ID for the controlled machine corresponding to the controlled machine management ID with reference to the machine ID relationship list 412. Then, the direct access request processing section 403 transmits a message on a direct access information acquisition request R16 to the corresponding network home electric appliance 600 over the network 1. The direct access information acquisition request R16 requests to obtain information used by the service server 300-1 to directly accessing the network home electric appliance 600.

Referring to FIG. 8, it is assumed that the direct access information providing section 625 within the network home electric appliance 600 already has logged in the XMPP server 404 of the direct access management server 400 and has completed the definition of a bidirectional permanent connection session with the direct access management server 400. It is also assumed in this embodiment that the network home electric appliance 600 is connected to the network 1 through a router. In response to the reception of the message on the direct access information acquisition request R16 from the direct access request processing section 403 within the direct access management server 400 over the permanent connection session, the direct access information providing section 625 creates a direct access URI including the global IP address and port number mapped to the local IP address and port number of the network home electric appliance 600 in the router and transmits it as a direct access information acquisition response R17 to the direct access management server 400 over the permanent connection session.

Referring to FIG. 4, in response to the reception of the message on the direct access information acquisition response R17 from the direct access information providing section 625 within the network home electric appliance 600 over the permanent connection session, the direct access request processing section 403 within the direct access management server 400 transmits the direct access URI included in the direct access information acquisition response R17 as a message on a direct access start response R18 to the service implementing section 302 within the service server 300-1, which requests the direct access start.

Referring to FIG. 3, in response to the reception of the message on the direct access start response R18 from the direct access request processing section 403 within the direct access management server 400, the service implementing section 302 within the service server 300-1 accesses the network home electric appliance 600 based on the direct access URI included in the direct access start response R18 and transmits a message on a remote programming command R19 including the programming information D5.

Referring to FIG. 8, in response to the reception of the message on the remote programming command R19 transmitted from the service server 300-1 over the network 1, the message transmitting section 621 within the network home electric appliance 600 registers the programming information D5 included in the remote programming command R19 with the programming list stored in the programming list storage section 622.

After that, the message transmitting section 621 transmits a message on a remote programming result notification R21 indicating the completion of the remote programming to the service server 300-1 over the network 1.

Referring to FIG. 3, in response to the reception of the message on the remote programming result notification R21 from the network home electric appliance 600, the service implementing section 302 within the service server 300-1 transmits a message on a remote programming result notification R22 to the terminal machine 500, which requests the remote programming, over the network 1.

Through the operation above, the remote programming on contents of a broadcast program, for example, selected by a user has completed in the terminal machine 500.

Having described the operation in a case where the remote programming service provided by the service server 300-1 is used, the same routine is performed in order to use other services such as services for deletion of recorded data and obtaining logs for detecting a problem in the network home electric appliance 600.

For example, the operation for using a service of deleting recorded data in the network home electric appliance 600 is as follows. It is assumed here that the service of deleting recoded data is provided by the service server 300-2. The message transmitting section 525 within the terminal machine 500 transmits a message on a recorded data deletion request including information on the selection of data to be deleted, which is selected by a user, to the service server 300-2, which provides the corresponding service, over the network 1. By performing the same routine as that for the remote programming request, the service implementing section 302 within the service server 300-2 in response to the reception of the message on the recorded data deletion request from the terminal machine 500 obtains a direct access URI of the network home electric appliance 600 corresponding to the combination of the terminal machine 500 and the recorded data deletion service from the direct access management server 400 over the network 1. Then, the service implementing section 302 accesses the network home electric appliance 600 based on the direct access URI and transmits a message on a recorded data deletion command including the selection information on the data to be deleted.

The operation for using the service of obtaining logs is as follows. It is assumed here that the service of obtaining logs is provided by the service server 300-3. The message transmitting section 525 within the terminal machine 500 transmits a message on a log acquisition request to the service server 300-3, which provides the log acquisition service, over the network 1. By performing the same routine as that for the remote programming request, the service implementing section 302 within the service server 300-3 in response to the message on the log acquisition request from the terminal machine 500 obtains a direct access URI of the network home electric appliance 600 corresponding to the combination of the terminal machine 500 and the log acquisition service from the direct access management server 400 over the network 1. Then, the service implementing section 302 accesses the network home electric appliance 600 based on the direct access URI and transmits a message on a log acquisition command.

Referring to FIG. 8, the contents data obtaining section 623 in the network home electric appliance 600 selectively receives contents data D1 of a broadcast program transmitted from the contents distribution server 200 over the network 1 by IP multicast broadcasting or contents data D2 of a broadcast program transmitted over broadcast waves from the broadcast station 3 of terrestrial analog television broadcasting, terrestrial digital television broadcasting, CS digital broadcasting or BS digital broadcasting, for example, based on the programming information D5 registered in the programming list storage section 622 and records it to the contents data storage section 624.

Next, an operation for notifying the terminal machine 500 of a message on an event will be described in a case where the event occurs in the network home electric appliance 600.

Figure 12:
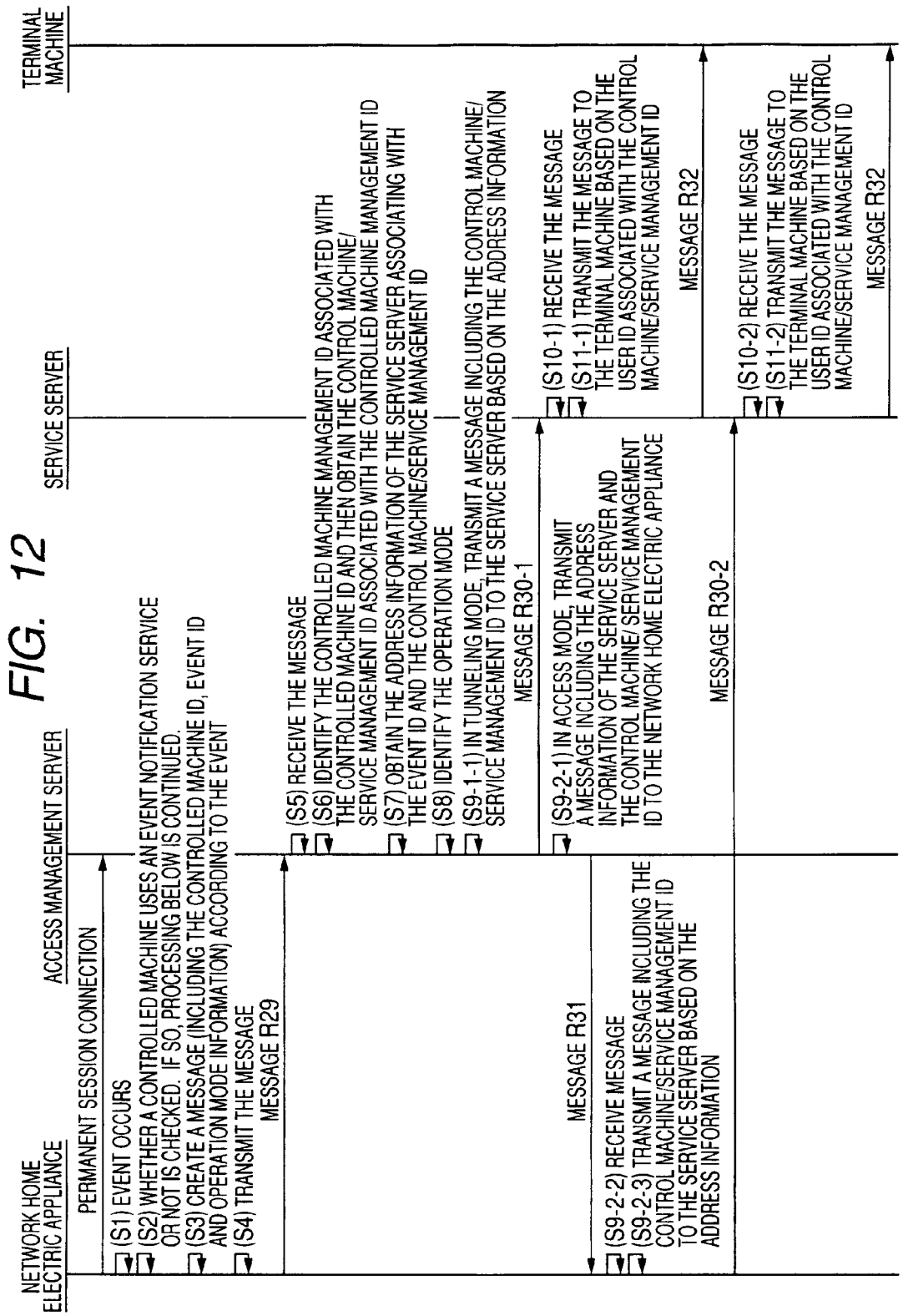
FIG. 12 is a sequence diagram showing a routine of transmitting a message on an event when the event occurs in a recorder/player.

FIG. 12 is a sequence diagram showing a routine of transmitting a message on an event in a case where the event occurs in the network home electric appliance 600.

Referring to FIG. 8, it is assumed that the direct access information providing section 625 within the network home electric appliance 600 already has logged in the XMPP server 404 of the direct access management server 400 and has completed the definition of a bidirectional permanent connection session with the direct access management server 400.

In response to the detection of an event by the event detecting section 627 within the network home electric appliance 600 (S1), whether the use of the event notification service is defined in the network home electric appliance 600 or not is determined (S2). The definition is performed in advance by a user through the input operation section 605, and the definition information may be stored in the storage section 613 (refer to FIG. 6).

The event detecting section 627 performs nothing if the definition that the event notification service is not to be used is determined. If it is determined that the use of the event notification service is defined, the event detecting section 627 creates a message corresponding to the type of event as follows.

That is, the event detecting section 627 determines an operation mode according to the type of the detected event. The operation mode is a mode regarding the method for transmitting a message to the service server 300 and may be "direct access mode" that directly transmits a message from the network home electric appliance 600 to the service server 300 over the network 1 or "tunneling model" that transmits a message to the service server 300 by tunneling through the direct access management server 400.

The selection of the operation mode may depend on the amount of data of the entire message, for example. In other words, for some events, a larger amount of data of an image or images such as a still image and moving images or audio may be attached to a message to transmit. The operation mode "direct access mode" is selected for the event with a larger amount of data of the entire message in order to avoid the increase in load on the direct access management server 400. On the other hand, the operation mode "tunneling mode" with a low number of transmission stages of a message is selected for an event the notification of which only includes text data.

The event detecting section 627 selects the operation mode in this way and then creates a message transmission command R33 including the event ID corresponding to the type of the detected event and the selected operation mode and gives it to the message transmitting section 621. The message transmitting section 621 in response to the reception of the message transmission command R33 creates a message including the controlled machine ID of the network home electric machine 600 and the event ID and operation mode information extracted from the message transmission command R33 (S3) and transmits it as a message R29 to the direct access management server 400 over a permanent connection session (S4).

In response to the reception of the message R29 from the network home electric appliance 600 over the permanent connection session established between the XMPP server 404 and the network home electric appliance 600 (S5), the event message transmission control section 405 within the direct access management server 400 determines the controlled machine management ID correlated with the controlled machine ID included in the received message R29 with reference to the machine ID relationship list 412 and then determines the control machine/service management ID correlated with the controlled machine management ID with reference to the management ID relationship list 411 (S6).

Next, the event message transmission control section 405 obtains the service ID relating to the event ID included in the received message R29 with reference to the event relationship list 413 (S7). Then, the event message transmission control section 405 determines the address information of the service server 300, which is the destination of the notification of the message with reference to the machine ID relationship list 412 based on the control machine/service management ID obtained in S6 and the service ID obtained at S7 (S8).

Specific examples of this operation will be described with reference to the examples including the management ID relationship list 411 shown in FIG. 9, the machine ID relationship list 412 shown in FIG. 10 and the event relationship list 413 shown in FIG. 11.

It is assumed here that an event with an event ID "E0112" occurs in the network home electric appliance 600, which is a controlled machine with a controlled machine management ID "D5678". In this case, the control machine/service management IDs correlated with the controlled machine management ID "D5678" are determined as two of "IDS1234" and "DS1235" on the management ID relationship list 411 in FIG. 9 (S6). Next, with reference to the event relationship list 413 in FIG. 11, the event message transmission control section 405 determines the address information "http://jp.service.002/" of the service server 300 relating to the control machine/service management ID "DS1234" or "DS1235" and the event ID "E0112" (S7).

Referring back to FIG. 12, after thus determining the address information of the service server 300, which is the destination of the notification of the message, the event message transmission control section 405 determines the operation mode for transmitting a message to the service server 300 based on the operation mode information included in the message R29 received from the network home electric appliance 600 (S8).

If the determined operation mode is "tunneling mode", the event message transmission control section 405 transmits a message R30-1 including the control machine/service management ID "IDS1234" obtained in S6 to the service server 300 over the network 1 based on the address information of the service server 300 obtained in S7 (S9-1-1).

If the determined operation mode is "direct access mode" on the other hand, the event message transmission control section 405 transmits a message R31 including the address information of the service server 300 obtained in S8 and the control machine/service management ID obtained in S6 to the network home electric appliance 600 over a permanent connection session (S9-2-1).

In response to the reception of the message R31 (S9-2-2) the network home electric appliance 600 transmits a message R30-2 including the control machine/service management ID "DS1234" to the service server 300 over the network 1 based on the address information of the service server 300 included in the message R31 (S9-2-3).

Referring to FIG. 3, in response to the reception of the message R30-1 or R30-2 including the control machine/service management ID in tunneling mode or direct access mode (S10-1 or S10-2), the service server 300 determines the user ID correlated with the control machine/service management ID included in the message R30-1 or R30-2 based on the ID relationship list 311 stored in the storage section 301 and transmits a message R32 to the terminal machine 500 based on the user ID (S11-1 or S11-2).

In response to the reception of the message over the network 1, the message transmitting section 525 within the terminal machine 500 displays the contents of the message on the display section 506, for example, for the notification to the user.

Next, with reference to FIG. 13, specific examples of correspondence will be described between events occurring in the network home electric appliance 600 and the terminal machine 500 (500-1, 500-2) that receives messages on the events. Notably, the processing by the direct access management server 400 and the service server 300 will be omitted herein.

Figure 13:
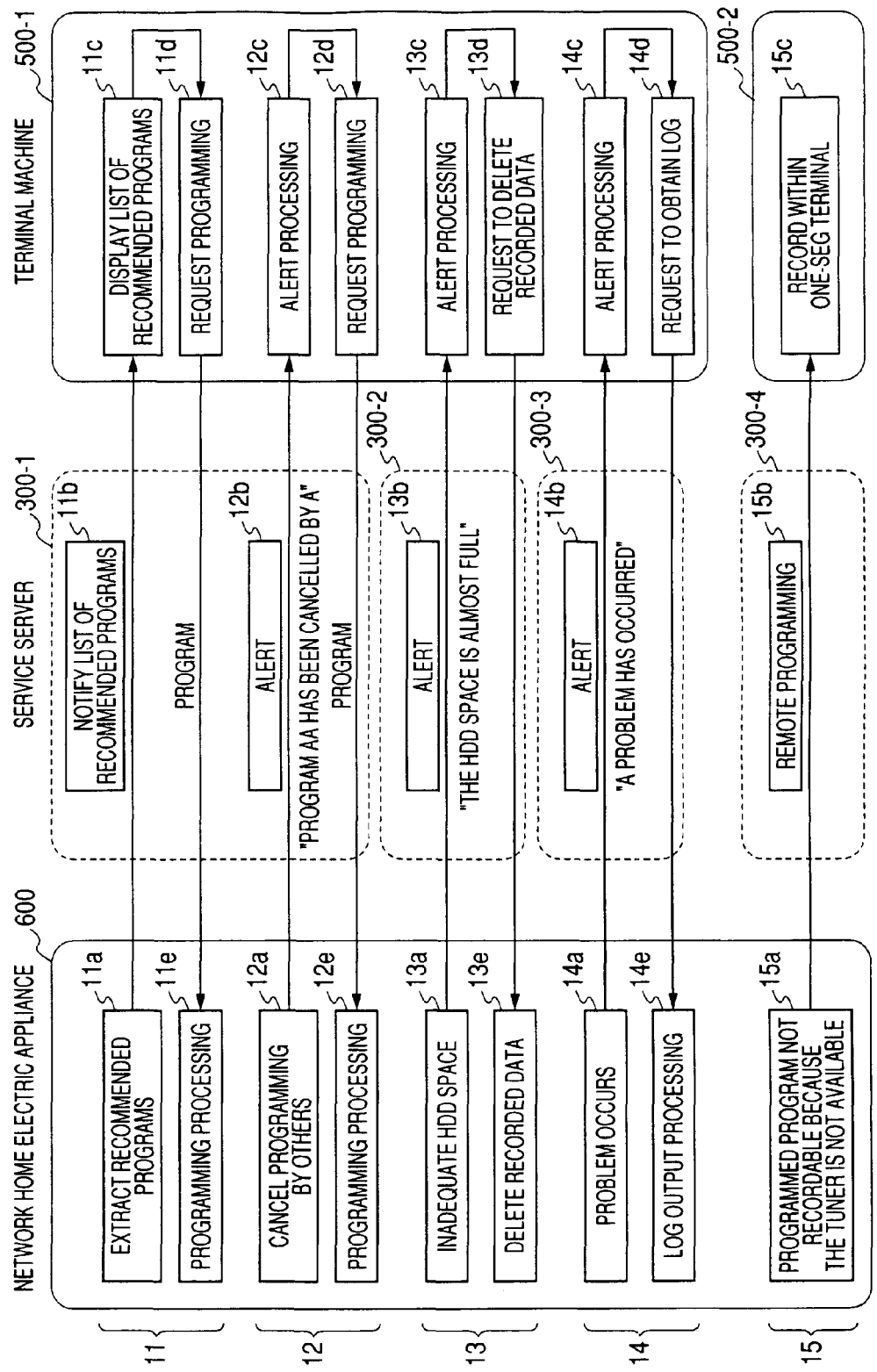
FIG. 13 is a diagram showing specific examples of events occurring in a recorder/player and responses by the terminal machine that receives the messages on the events.

The reference numeral "11" in FIG. 13 refers to an example of the case where an event 11a that "EXTRACT RECOMMENDED PROGRAMS" is detected by the event detecting section 627 of the network home electric appliance 600. The event "EXTRACT RECOMMENDED PROGRAMS" may be implemented by managing keys for the genres, titles, performers and so on of the programs programmed in the past and, in response to the acquisition of new contents guide data, automatically searching programs including the keys through the new contents guide data. If the event 11a "EXTRACT RECOMMENDED PROGRAMS" is detected, a list of the extracted recommended programs is notified as a message 11b from the network home electric appliance 600 to the terminal machine 500-1. The terminal machine 500-1 in response to the reception of the message 11b displays the list of recommended programs on the display section 506, for example (11c). A user of the terminal machine 500-1 uses the input operation section 505 to select a program to perform remote programming from the list of recommended programs and input a request 11d for the remote programming. The operation for the remote programming is as described above.

The network home electric appliance 600 in response to the reception of the request 11d for the remote programming performs processing lie for remote programming on the selected recommended program.

The reference numeral "12" in FIG. 13 refers to an example of the case where an event 12a that "PROGRAMMING CANCELLED BY OTHERS" is detected by the event detecting section 627 of the network home electric appliance 600. The event "PROGRAMMING CANCELLED BY OTHERS" refers to a case where remote programming has been performed on the network home electric appliance 600 by a user excluding the user of the terminal machine 500-1 or remote programming has been performed by directly operating the network home electric appliance 600 in a case where the network home electric appliance 600 is available to multiple users including the user of the terminal machine 500-1. If the event 12a "PROGRAMMING CANCELLED BY OTHERS" is detected, an alert relating to the cancel of programming by others is notified as a message 12b from the network home electric appliance 600 to the terminal machine 500-1. The terminal machine 500-1 in response to the reception of the message 12b displays the alert relating to the cancel of programming by others on the display section 506, for example (12c). The user of the terminal machine 500-1 after checking it uses the input operation section 505 to input a request 12d for remote programming to implement the canceled programming again. As described above, the network home electric appliance 600 in response to the reception of the request 12d for the remote programming performs processing 12e for remote programming on the program the programming of which has been cancelled.

The reference numeral "13" in FIG. 13 refers to an example of the case where an event 13a that "INADEQUATE HDD SPACE" is detected by the event detecting section 627 of the network home electric appliance 600. The event 13a refers to a case where the contents data storage section 624 (refer to FIG. 8) does not have an adequate space for recording contents data. If the event 13a "INADEQUATE HDD SPACE" is detected, an alert of the inadequate HDD space is notified as a message 13b from the network home electric appliance 600 to the terminal machine 500-1. The terminal machine 500-1 in response to the reception of the message 13b displays the alert of the inadequate HDD space on the display section 506, for example (13c). A user of the terminal machine 500-1 after checking it uses the input operation section 505 to input a request 13d to delete recorded data in the network home electric appliance 600. The network home electric appliance 600 in response to the reception of the request 13d to delete recorded data performs processing 13e of deleting recorded data by the title, for example, within the contents data storage section 624 (refer to FIG. 8).

The reference numeral "14" in FIG. 13 refers to an example of the case where an event 14a that "PROBLEM OCCURS" is detected by the event detecting section 627 of the network home electric appliance 600. If the event 14a "PROBLEM OCCURS" is detected, an alert relating to the occurrence of a problem is notified as a message 14b from the network home electric appliance 600 to the terminal machine 500-1. The terminal machine 500-1 in response to the reception of the message 14b displays the alert of the occurrence of a problem on the display section 506, for example (14c). A user of the terminal machine 500 after checking it uses the input operation section 505 to input a request 14d to obtain logs to the network home electric appliance 600. The network home electric appliance 600 in response to the reception of the request 14d to obtain logs performs processing 14e of outputting logs to the terminal machine 500-1.

The reference numeral "15" in FIG. 13 refers to an example of the case where an event 15a that "PROGRAMMED PROGRAM NOT RECORDABLE BECAUSE THE TUNER IS NOT AVAILABLE" is detected by the event detecting section 627 of the network home electric appliance 600. The event 15a refers to a case where programming is not allowed because the tuner for receiving broadcasting of the program selected to record is used for recording a different program. If the event 15a is detected, a request for remote programming including information for programming is transmitted as a message 15b from the network home electric appliance 600 to the different terminal machine (One-Seg terminal) 500-2, which can receive One-Seg broadcasting. The terminal machine 500-2 in response to the reception of the message 15b performs processing for remote programming (15c).

For example, among the four service servers 300-1, 300-2, 300-3 and 300-4, the service server 300-1 may provide the service of remote programming, the service server 300-2 may provide the service of deleting recorded data, the service server 300-3 may provide the service of obtaining logs, and the service server 300-4 may provide the service of remote programming on a One-Seg terminal. In this case, the event IDs of the events 11a "EXTRACT RECOMMENDED PROGRAMS" and 12a "PROGRAMMING CANCELLED BY OTHERS" may be registered with the event relationship list 413 in connection with the address information of the service server 300-1 that performs the service of remote programming. Thus, the messages 11b and 12b on "EXTRACT RECOMMENDED PROGRAMS" and "PROGRAMMING CANCELLED BY OTHERS" may be transmitted to the service server 300-1 and be then transmitted from the service server 300-1 to the terminal machine 500-1.

The event ID of the event 13a "INADEQUATE HDD SPACE" may be registered with the event relationship list 413 in connection with the address information of the service server 300-2 that performs the service of deleting recorded data. Thus, the message 13b on "INADEQUATE HDD SPACE" may be transmitted to the service server 300-2 and be then transmitted from the service server 300-2 to the terminal machine 500-1.

The event ID of the event 14a "PROBLEM OCCURS" may be registered with the event relationship list 413 in connection with the address information of the service server 300-3 that performs the service of obtaining logs. Thus, the message 14b on "PROBLEM OCCURS" may be transmitted to the service server 300-3 and be then transmitted from the service server 300-3 to the terminal machine 500-1.

The event ID of the event 15a "PROGRAMMED PROGRAM NOT RECORDABLE BECAUSE THE TUNER IS NOT AVAILABLE" may be registered with the event relationship list 413 in connection with the address information of the service server 300-4 that performs the service of remote programming on a different machine. Thus, the message 15b on "PROGRAMMED PROGRAM NOT RECORDABLE BECAUSE THE TUNER IS NOT AVAILABLE" may be transmitted to the service server 300-4 and be transmitted from the service server 300-4 to the different terminal machine 500-2.

As described above, according to this embodiment, a message on an event occurring in the network home electric appliance 600 can be transmitted to a proper service server, without managing the address information of the service server 300, which is the destination of the notification of the message according to the type of the event, in the network home electric appliance 600. The management of the type of the service corresponding to the type of event and the address information of the service server 300 that provides the service for the type by the direct access management server 400 allows changing the information managed by the direct access management server 400 only in a case where the number of kinds of services to be provided by the service server 300 increases or decreases or the location of the service server 300 is changed, for example. Thus, the necessity for the change on the network home electric appliance 600 side can be eliminated, which can save the time of a user of the network home electric appliance 600.

According to this embodiment, the mode for transmitting a message on an event to the service server 300 may be defined to "direct access mode" that directly transmits a message from the network home electric appliance 600 to the service server 300 over the network 1 or "tunneling mode" that transmits a message to the service server 300 by tunneling through the direct access management server 400. The mode can be selected according to the size of the entire message, for example, which allows efficient message transmission.

Having described the embodiment as a network system deploying a recorder/player as a controlled machine, the invention is not limited thereto. The invention is also applicable to a system deploying, as a controlled machine, a network home electric appliance such as a television, a refrigerator and a washing machine, which can be connected to a network. For example, the invention is effectively applicable as a system that notifies an event such as the occurrence of a problem in such a network home electric appliance to a terminal machine.

Having described the embodiment in which a message on the remote programming command R19, for example, is transmitted to the network home electric appliance 600 based on the direct access URI, which is obtained by the service server 300 from the direct access management server 400, a message on the remote programming command R19 may be transmitted from the terminal machine 500 to the network home electric appliance 600 by obtaining the direct access URI from the service server 300 by the terminal machine 500 over the network 1.

Having described the embodiment in which the service server 300 and the direct access management server 400 are implemented by different server machines, the service server 300 and the direct access management server 400 may be united to one server by building the software for the service server 300 and the software for the direct access management server 400 into one server machine.

Having described the embodiment in which, in the terminal machine 500, contents of a program to view is selected from a contents guide, and the contents data is obtained and played, the invention is not limited to the method in which contents is selected, without the step of selecting contents to view from an EPG as described above.

The invention is not limited to the embodiment above, and it is apparent that various changes can be made thereto without departing from the scope and spirit of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A network system comprising:
a terminal device;
a network appliance to be controlled by the terminal device;
a service server that provides a service for controlling the network appliance over a network to the terminal device; and an access management server that receives and transmits information for accessing the network appliance over the network, the network appliance includes an event detecting unit that detects when an event occurs at the network appliance and determines whether the event is a predefined type; and a message transmitting section that, when the event occurs and the event detecting unit determines that the event is the predefined type, transmits a first message including event identification information for identification of the type of the event and machine identification information of the network appliance to the access management server, and when the event occurs and the event detecting unit determines that the event is not the predefined type, the first message is not transmitted to the access management server, and the access management server including:

a storage section that stores:

a management ID relationship list including a relationship between a control service management ID assigned to a combination between the identification information of the terminal device and a service to be provided by the service server and a controlled machine management ID assigned to the network appliance to be controlled by the terminal device, and an event relationship list including a relationship among the event identification information, the control service management ID and address information of the service server; and an event message transmission control section that performs operations comprising:

identifying the address information of the service server, which is a destination of a notification of the event, based on the management ID relationship list and the event relationship list stored in the storage section and the event identification information and machine identification information included in the first message received from the network appliance, and transmitting a second message, based on the identified address information of the service server, to cause the service server to be notified of the event.

2. An access management server coupled to a network along with a terminal device, a network appliance to be controlled by the terminal device and a service server that provides a service for controlling the network appliance over the network to the terminal device, the access management server receiving and transmitting information for accessing the network appliance over the network, the access management server comprising:

a storage section that stores:

a management ID relationship list including a relationship between a control service management ID assigned to a combination between the identification information of the terminal device and a service to be provided by the service server and a controlled machine management ID assigned to the network appliance to be controlled by the terminal device, and an event relationship list including a relationship among the event identification information, the control service management ID and address information of the service server; and an event message transmission control section that performs operations comprising:

identifying the address information of the service server, which is a destination of a notification of an event, based on the management ID relationship list and the event relationship list stored in the storage section and type information of the event and machine identification information of the network appliance included in a first message transmitted by the network appliance when the event occurs, and transmitting a second message, based on the identified address information of the service server, to cause the service server to be notified of the event, wherein the network appliance includes an event detecting unit that detects when the event occurs at the network appliance and determines whether the event is a predefined type, the network appliance transmits the first message to the access management server when it is determined that the event is the predefined type, and the network appliance does not transmit the first message to the access management server when it is determined that the event is not the predefined type.

3. The access management server according to claim 2, wherein, based on operation mode information included in the message transmitted by the network appliance when the event occurs, the event message transmission control section switches between an access mode, in which the event is notified from the network appliance to the service server over the network, and a tunneling mode in which the event is notified to the service server by tunneling through the access management server, in the access mode, the event message transmission control section transmits the address information of the service server, which is the destination of the notification of the event, to the network appliance, and in the tunneling mode, the event message transmission control section transmits the event to the service server based on the address information.

4. The access management server according to claim 2, further comprising: means for defining a permanent connection session with the network appliance over the network.

5. An event notification method for notifying a service server of an event occurring in a network appliance in a network system in which a terminal device, the network appliance to be controlled by the terminal device, the service server that provides a service for controlling the network machine over a network to the terminal device, and an access management server that receives and transmits information for accessing the network appliance over the network are connected to the network, the method comprising:

storing, in a storage section of the access management server, a management ID relationship list including a relationship between a control service management ID assigned to a combination between the identification information of the terminal device and a service to be provided by the service server and a controlled machine management ID assigned to the network appliance to be controlled by the terminal device, and an event relationship list including a relationship among the event identification information, the control service management ID and address information of the service server;

when the event occurs, transmitting a first message including event identification information for identifying a type of the event and machine identification information of the network appliance from a message transmitting section in the network appliance to the access management server;

identifying, by an event message transmission control section in the access management server, the address information of the service server, which is a destination of a notification of the event, based on the management ID relationship list and the event relationship list stored in the storage section and the event identification information and machine identification information included in first message received from the network appliance; and transmitting a second message, from the event message transmission control section in the access management server based on the identified address information of the service server, to cause the service server to be notified of the event, wherein the network appliance includes an event detecting unit that detects when the event occurs at the network appliance and determines whether the event is a predefined type, the network appliance transmits the first message to the access management server when it is determined that the event is the predefined type, and the network appliance does not transmit the first message to the access management server when it is determined that the event is not the predefined type.

6. A non-transitory storage medium storing a computer program for an access management server connectable to a network along with a terminal device, a network appliance to be controlled by the terminal device, and a service server that provides a service for controlling the network appliance over the network to the terminal device, the access management server receiving and transmitting information for accessing the network appliance over the network, the program causing a computer to function as:

a storage section that stores:

management ID relationship list including a relationship between a control service management ID assigned to a combination between the identification information of the terminal device and a service to be provided by the service server and a controlled machine management ID assigned to the network appliance to be controlled by the terminal device, and an event relationship list including a relationship among event identification information, the control service management ID and address information of the service server; and an event message transmission control section that performs operations comprising:

identifying the address information of the service server, which is a destination of a notification of an event, based on the management ID relationship list and the event relationship list stored in the storage section and type information of the event and machine identification information of the network appliance included in a first message transmitted from the network appliance when the event occurs, and transmitting a second message, based on the identified address information of the service server, to cause the service server to be notified of the event, wherein the network appliance includes an event detecting unit that detects when the event occurs at the network appliance and determines whether the event is a predefined type, the network appliance transmits the first message to the access management server when it is determined that the event is the predefined type, and the network appliance does not transmit the first message to the access management server when it is determined that the event is not the predefined type.

* * * * *